United States Patent [19]

Kawade

[11] Patent Number: 5,044,908
[45] Date of Patent: Sep. 3, 1991

[54] VANE-TYPE ROTARY COMPRESSOR WITH SIDE PLATES HAVING SEPARATE BOSS AND FLANGE SECTIONS

[75] Inventor: Tsuneshige Kawade, Kanagawa, Japan

[73] Assignee: Atsugi Motor Parts Company, Limited, Kanagawa, Japan

[21] Appl. No.: 327,335

[22] Filed: Mar. 22, 1989

[30] Foreign Application Priority Data

Mar. 22, 1988 [JP] Japan .................................. 63-65746

[51] Int. Cl.$^5$ ..................... F04C 18/344; F04C 29/04; F16C 35/04
[52] U.S. Cl. ..................................... 418/179; 384/557
[58] Field of Search ................ 418/83, 133, 179, 178; 384/493, 557, 905

[56] References Cited

U.S. PATENT DOCUMENTS

| | | | |
|---|---|---|---|
| 3,884,601 | 5/1975 | Anthony | 418/179 |
| 4,545,749 | 10/1985 | Sakamaki et al. | 418/179 |
| 4,598,559 | 7/1986 | Tomayko et al. | 418/133 |
| 4,615,663 | 10/1986 | Iio et al. | 418/83 |
| 4,907,897 | 3/1990 | Shirotori | 384/493 |

FOREIGN PATENT DOCUMENTS

| | | | |
|---|---|---|---|
| 56-9686 | 1/1981 | Japan | 418/179 |
| 62-111184 | 5/1987 | Japan | 418/179 |

Primary Examiner—John J. Vrablik
Attorney, Agent, or Firm—Bachman & LaPointe

[57] ABSTRACT

A vane-type rotary compressor is provided with front and rear side plates for closing both axial ends of a cam ring, are provided boss sections for receiving bearing for rotatably supporting rotor shaft, and a flange sections radially extending from the associated boss sections. The boss section and the flange section are made of different material and formed into integral form by insert casting. Namely, the boss section is made of a material having a linear expansion coefficient substantially equal to the linear expansion coefficient of a bearing. Furthermore, the boss section is formed with one or more radially extending projections.

3 Claims, 4 Drawing Sheets

000
VANE-TYPE ROTARY COMPRESSOR WITH SIDE PLATES HAVING SEPARATE BOSS AND FLANGE SECTIONS

BACKGROUND OF THE INVENTION

1. Field of the Invention

The present invention relates generally to a vane-type rotary compressor which can be suitably used in an automotive air conditioner system and so forth. More specifically, the invention relates to production of a vane-type rotary compressor.

2. Description of the Background Art

In general, a vane-type rotary compressor has a rotor carrying a plurality of rotor vanes which are disposed in the rotor for radial movement toward and away with respect to vane receptacles formed in the rotor body. The rotor is received within a cam ring in rotatable fashion. Both axial ends of the cam ring are closed by means of a front and side plates. The cam ring, the rotor with the vanes, the front and side plates forms a rotor assembly. The rotor assembly is housed within a housing.

The cam ring defines a oval or elliptic rotor receptacle opening to receive therein the rotor. The rotor vanes radially movably disposed within the vane receptacles move to maintain sliding contact with the inner periphery of the opening. With this construction, a plurality of mutually separated working chambers are defined between the adjacent rotor vanes. During one cycle of rotation, each working chamber is subject to expansion of volume and compression of volume. In the rotational angular range in which the volume of working chamber is increased, a working fluid is drawn and introduced into the working chamber. On the other hand, the rotational angular range, in which the volume of the working chamber is decreased, a working fluid in the working chamber is compressed and discharged from the working chamber.

In the recent years, requirement for lighter weight compressor becomes stronger. In order to answer such requirement. Japanese Utility Model First (unexamined) Publication (Jikkai) Showa 59-27101 discloses a vane-type compressor which comprises a rotor, side plate, cam ring and so forth made of aluminium or aluminium alloy. An aluminium or aluminium alloy is a useful material for reducing the weight of the compressor. On the other hand, such materials may encounter other problems because of relative great linear expansion coefficient. In case that the aluminium material is used for forming the side plate, contact pressure between a periphery of a boss section and ball or needle bearing changes according to rising of temperature during compressor operation.

In general, the bearing is disposed in the boss section with contracting the inner diameter thereof. A clearance between the periphery of the boss section and the bearing is set with respect to the contracted diameter upon assembling under normal temperature. As will be appreciated, since the linear expansion coefficient of the aluminium side plate is greater than the bearing which is made of steel, contacting pressure between the engaging surfaces of the boss section of the aluminium side plate and the bearing can be decreased according to rising of the temperature. This expands clearance between the bearing and the rotor shaft. Expansion of clearance may particularly affect unbalanced vane-type compressor, such as five vane-type compressor. Namely, in such unbalanced-type compressors, the rotor shaft tends to be driven by its axis offset from the center. The offset of the rotor shaft tends to create noise and/or vibration. Also, offset of the rotor shaft axis can cause baking in between mating surfaces of the cam ring and the rotor to degrade durability.

SUMMARY OF THE INVENTION

Therefore, it is an object of the invention to provide a vane-type rotary compressor which can improve the drawbacks in the prior art compressor.

Another object of the invention is to provide a vane-type rotary compressor which can maintain the set clearance even when the side plate is formed of an aluminium or aluminium alloy.

In order to accomplish aforementioned and other objects, a vane-type rotary compressor, according to the present invention, front and rear side plates for closing both axial ends of a cam ring, boss sections for receiving bearings for rotatably supporting rotor shaft, and flange sections radially extending from the associated boss sections are provided. The boss section and the flange section are made of different material and formed into integral form by insert casting. Namely, the boss section is made of a material having a linear expansion coefficient substantially equal to the linear expansion coefficient of a bearing. Furthermore, the boss section is formed with one or more radially extending projections.

According to one aspect of the invention, a vane-type rotary compressor comprises:

a compressor housing;

a cam ring disposed within a compressor housing and defining an essentially elliptic opening;

a rotor carrying a plurality of rotor vanes for defining working chambers between adjacent vanes, the rotor being coupled with a rotor shaft for rotation therewith;

side plates fitted on both axial ends of the cam ring for closing both axial ends of the cam ring, each of the side plates comprising a boss section and a flange section radially extending from the boss section, the boss section receiving a bearing member for rotatably supporting the rotary shaft, the flange section being formed of an aluminium containing material, and the boss section being formed of a material having a linear expansion coefficient approximately equal to the linear expansion coefficient of the bearing member.

According to another aspect of the invention, a vane-type rotary compressor comprises:

a compressor housing;

a cam ring disposed within a compressor housing and defining an essentially elliptic opening;

a rotor carrying a plurality of rotor vanes for defining working chambers between adjacent vanes, the rotor being coupled with a rotor shaft for rotation therewith;

side plates fitted on both axial ends of the cam ring for closing both axial ends of the cam ring, each of the side plates comprising a boss section and a flange section radially extending from the boss section, the boss section receiving a bearing member made of an iron containing material for rotatably supporting the rotary shaft, the flange section being formed of an aluminium containing material, and the boss section being formed with iron containing material having linear expansion coefficient approximately equal to the linear expansion coefficient of the bearing member.

The boss section is exposed from the material forming the flange section. In the preferred construction, the boss section and the flange section are formed substantially in integral form by insert casting. The boss section is formed with a radially extending portion which is mechanically secured to the associated portion of the flange section. The radially extending portion of the boss section comprises at least one radially extending projection, a through opening is formed through the projection and associated portion of the flange section for receiving a securing means for establishing tight interfitting between the boss section and the flange section.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
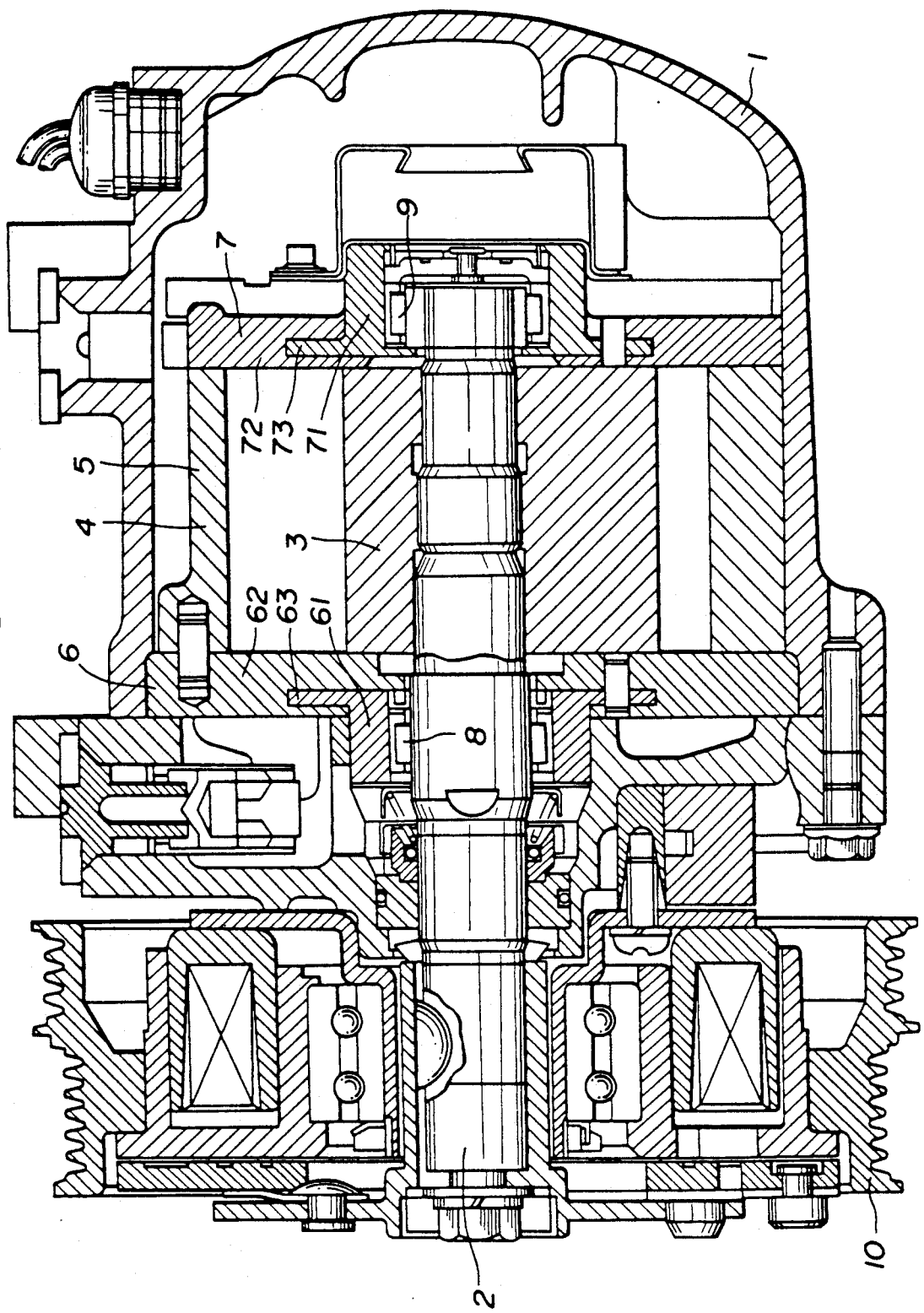
FIG. 1 is a sectional view of the preferred embodiment of a vane-type rotary compressor according to the present invention.

Referring now to the drawings, particularly to FIG. 1, a rotor 3 is fixed with a rotor shaft 2 for rotation therewith. The rotor 3 with the rotor shaft 2 is rotatably disposed in a compressor housing 1. The rotor 3 carries a plurality of rotor vanes 4 within radial vane receptacle grooves so that the vane can move within the receptacle groove in a radial direction. The rotor 3 with the rotor vanes 4 is rotatably disposed within an elliptic opening formed through a cam ring 5. Both axial ends of the cam ring 5 are closed by front and rear side plates 6 and 7. Bearing members 8 and 9 are provided in the front and rear side plates 6 and 7 for rotatably supporting the rotor shaft 2. In the shown embodiment, needle bearings are employed as the bearing members 8 and 9.

As shown, the rotor shaft 2 extends from the compressor housing 1 to project the front end therefrom. A pulley 10 is fixedly mounted on the front end of the rotor shaft 2 for rotation therewith. The pulley 10 is mechanically connected to a power train to be rotatingly driven by an external driving means, such as an automotive internal combustion engine, for example.

Figure 3:
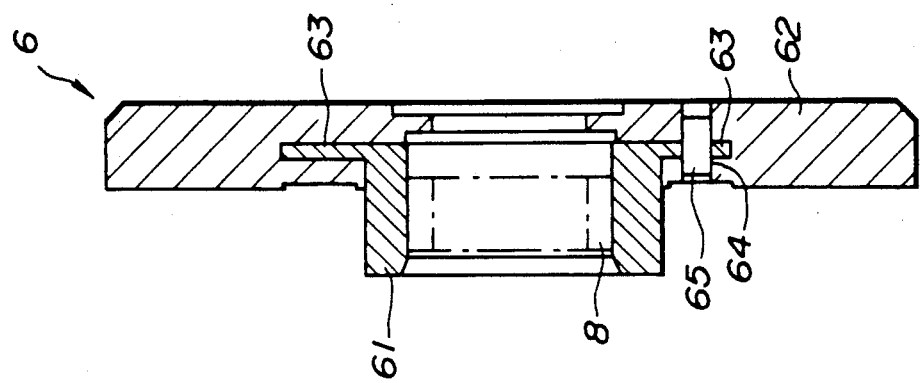
FIG. 3 is a section taken along line III—III of FIG. 2.
Figure 2:
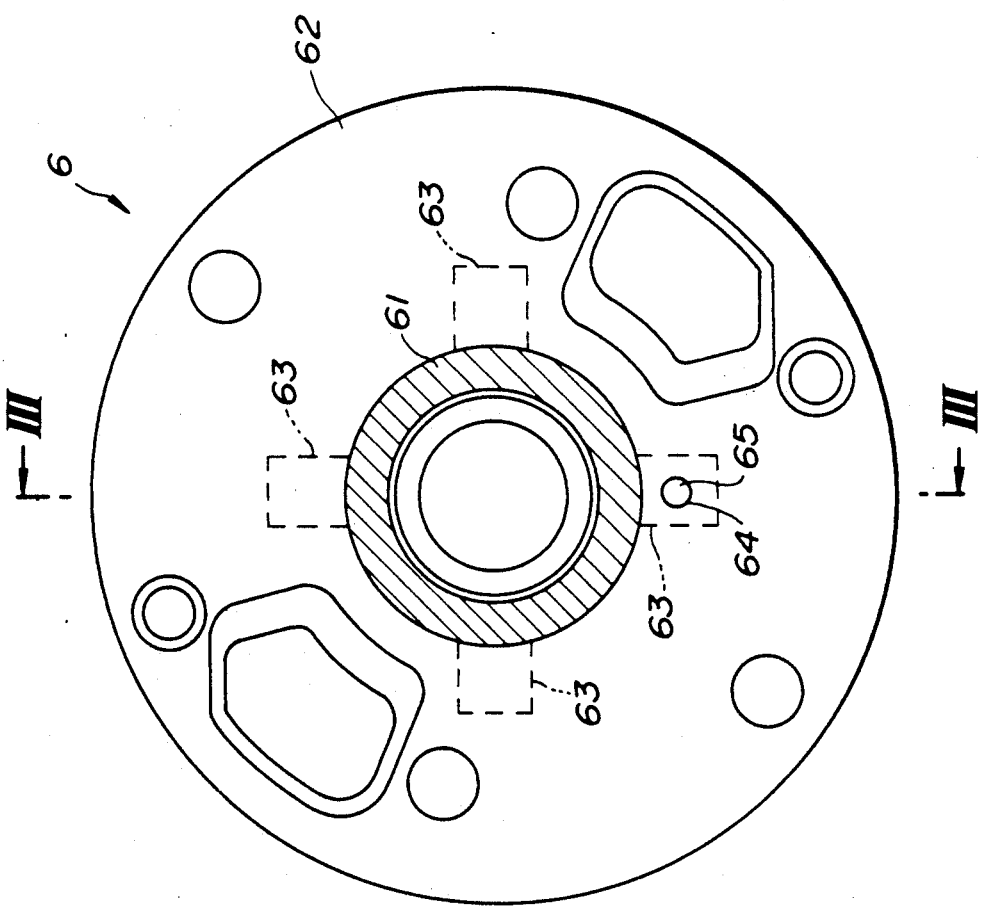
FIG. 2 is a front elevation of a front side plate employed in the preferred embodiment of the rotary compressor of FIG. 1.
Figure 5:
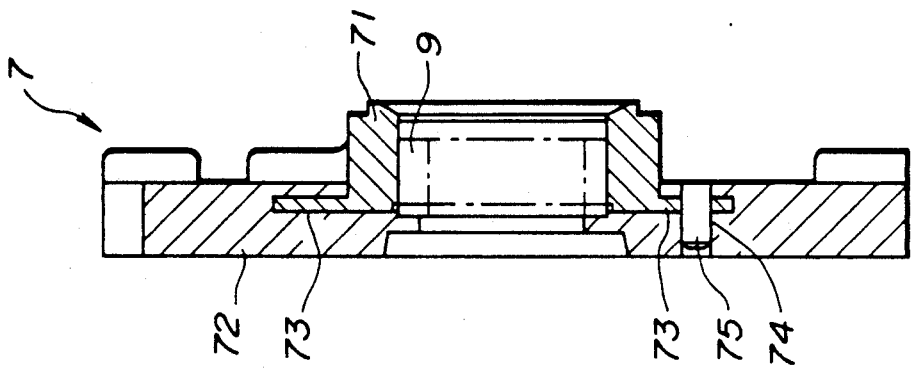
FIG. 5 is a section taken along line V—V of FIG. 4.

As shown in FIGS. 2 and 3, the front plate 6 has a boss section 61 and a flange section 62 extending radially from the boss section. The boss section 61 is formed of a cast iron or ferro-alloy so that the linear expansion coefficient thereof is approximately equal to that of the needle bearing 8 engaged therewithin. Four radially extending projections 63 are formed with the boss section 61. Number and configuration of the projection 63 can be of any desired configurations which are suitable for restricting radial expansion of a bore size of the boss section. Furthermore, the bore size expansion restricting means, i.e., Projection 63, is not necessarily the form of a projection a but can be in a form of a radially extending flange, for example. On the other hand, the flange section 62 is formed of aluminium or aluminium alloy.

In production of the front side plate 6, the boss section 61 is, at first, cast in a form having the projections 63. The boss section 61 is then placed in a casting mold of the flange section. Insert casting is thus performed by filling the casting mold with the molten aluminium or aluminium alloy material. Therefore, the projections 63 can be placed within the cast flange section 62 for establishing integrality of the cast boss section 61 and the flange section 62. Thereafter, through hole 64 extending through the flange section 62 and one of the projections 63 is formed. A knock pin 65 is pressed into the through hole 64 so as to assure interfitting between the boss section 61 and the flange section 62.

The knock pin 65 can be replaced with a lock tight screw or rivet.

Figure 4:
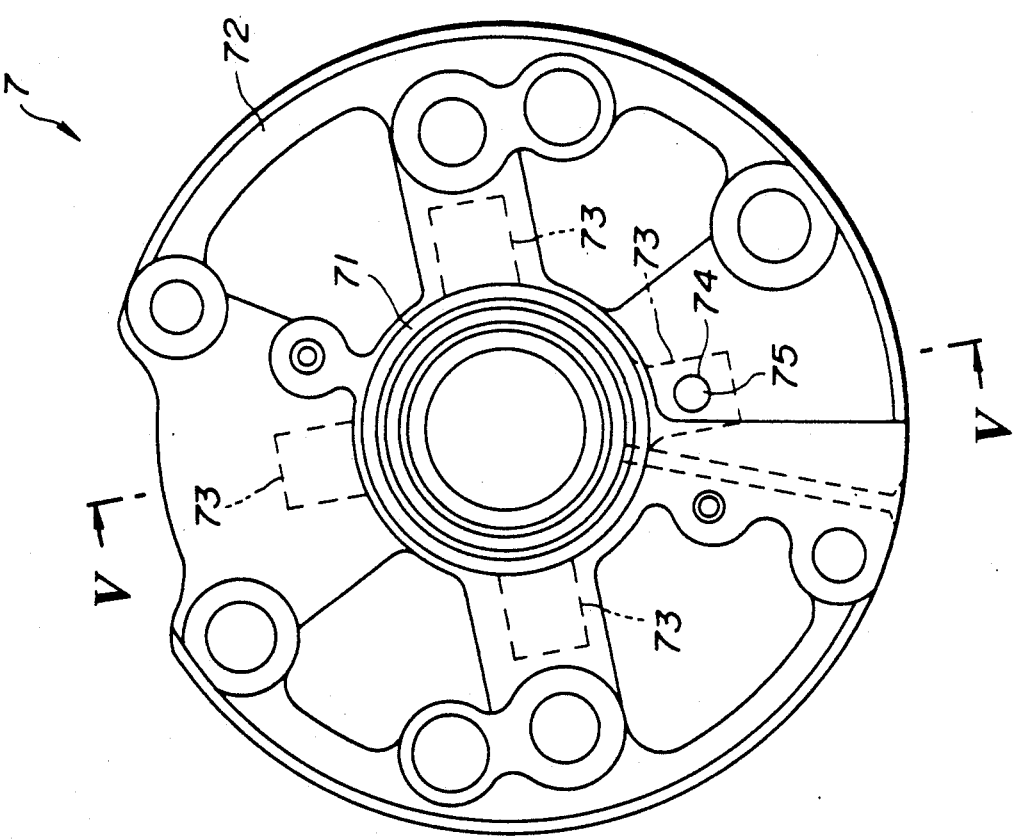
FIG. 4 is a front elevation of a rear side plate employed in the preferred embodiment of the rotary compressor of FIG. 1.

Similarly to the foregoing front side plate 6, the rear side plate 7 comprises a boss section 71 and a flange section 72, as shown in FIGS. 3 and 4. The boss section 71 is formed of a cast iron or ferro-alloy so that the linear expansion coefficient thereof is approximately equal to that of the needle bearing 8 engaged therewithin. Four radially extending projections 73 are formed with the boss section 71. Number and configuration of the projection 73 can be of any desired configurations which are suitable for restricting radial expansion of a bore size of the boss section. Furthermore the bore size expansion restricting means i.e., projection 73, the form of projection can be in a form of a radially extending flange, for example. On the other hand, the flange section 72 is formed of aluminium or aluminium alloy.

In production of the rear side plate 7, the boss section 71 is, at first, cast in a form having the projections 73. The boss section 71 is then placed in a casting mold of the flange section. Insert casting is thus performed by filling the casting mold with the molten aluminium or aluminium alloy material. Therefore, the projections 73 can be placed within the cast flange section 72 for establishing integrality of the cast boss section 71 and the flange section 72. Thereafter, through hole 74 extending through the flange section 72 and one of the projections 73 is formed. A knock pin 75 is pressed into the through hole 74 so as to assure interfitting between the boss section 71 and the flange section 72.

In the preferred embodiment, the rotor shaft 2 is made of a material of SCM420H; the bearings 8 and 9 are formed of SUJ steel; and boss sections 61 and 71 are formed of AC2A (or ADC12). The linear expansion coefficient of the boss section 61 and 71 becomes approximately equal to the rotor shaft 2 and the bearings 8 and 9. On the other hand, the rotor 3 is formed of A4000 type aluminium; and the cam ring 5 is formed of A390 type aluminium. By forming the rotor 3 and cam ring by aluminium or aluminium alloy material, the whole weight of the compressor can be significantly reduced.

In operating condition of the compressor, the rotor 3 is driven by a driving torque transmitted through the pulley 10 and the rotor shaft 2. During rotation, respective vanes 4 carried by the rotor 3 are pressed toward the inner periphery of the elliptic opening of the cam ring 5 by a fluid pressure introduced into the vane receptacle grooves in per se well known manner. By elliptic configuration of the opening of the cam ring 5, volume of each working chamber defined by adjacent vanes 4 varies to operate in induction mode and discharge mode. Namely, in the rotational stroke, in which the volume of the working chamber is increased, the working chamber operates in the induction mode for introducing the working fluid into the working chamber. On the other hand, in the rotational stroke, in which the volume of the working chamber is decreased, the working chamber operates in the discharge mode for compressing for generating the high pressure working fluid and discharging the pressurized working fluid.

During this compressor operation, the internal temperature of the compressor can rise approximately 200° C. According to rising of the internal temperature, respective component of the compressor cause thermal expansion in a rate determined according to respective linear expansion coefficient. According to the present invention, since the material for forming the boss sections 61 and 71 of the front and rear side plates 6 and 7 is selected to have approximately equal linear expansion coefficient to that of the bearings 8 and 9, the clearances between the rotor shaft 2 and the bearings 8 and 9 set upon assembling can be maintained substantially constant.

Furthermore, in the shown embodiment, practical linear expansion coefficient of the boss sections 61 and 71 is slightly greater than that (about $2 \times 10^{-6}$ cm/° C.) of the bearings 8 and 9. Therefore, expansion of the bearings 8 and 9 becomes greater than that of the boss sections 6 and 7. Therefore, according to rising of the internal temperature in the compressor, the clearance tends to be reduced.

Figure 6:
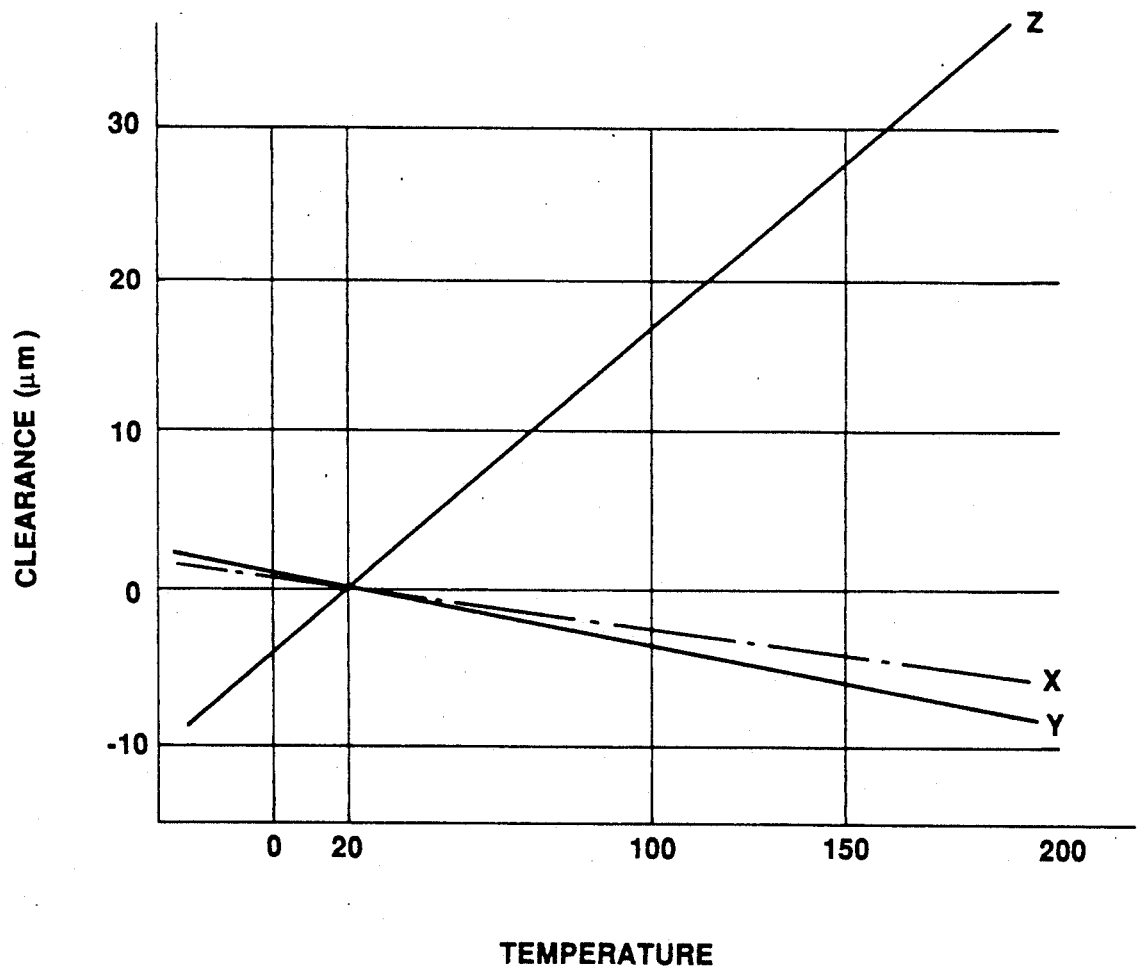
FIG. 6 is a graph showing variation of clearance relative to the temperature and the boss section of the side plate.

In FIG. 6 the relationship between the clearance and the temperature is shown by a line x in the compressor according to the invention. In order to compare the invention, the relationship between the clearance and the temperature when the whole body of the side plate is formed of FCA material is illustrated by a line y; and when the whole body of the side plate is formed of AC1A material is illustrated by a line z. As will be clear from FIG. 6, the preferred embodiment of the compressor reduces clearance between the bearing and the rotor shaft. Therefore, offset of the axis of the rotor shaft at high temperature condition will never occur to successfully prevent creation of noise and vibration. Furthermore, since the rotor can be driven stably, the present invention can achieve substantial improvement in durability.

On the other hand, the components of the compressor may be repeatedly subject to a heat cycle of −30° C. to 200° C. It is possible to cause slaking and play between the boss section 61 and 71 and the flange section 62 and 72 due to secular variation or excessively high temperature. However, according to the present invention, by providing the projections with the boss section and fixing the projection by means of the knock pin or so forth, interfitting between the boss section and the flange section can be assured. Therefore, according to the present invention, influence of the secular variation, excessive heat or repeated heat cycle can be successfully avoided.

In addition, when the boss section 61 and 71 is completely surrounded by the aluminium material which forms the flange section 62 and 72 by insert casting, tightening margin decreases according to rising of the temperature because of the greater linear expansion coefficient of the aluminium material versus the iron or ferro-alloy material and becomes zero at a certain temperature. Until the tightening margin becomes zero, the internal diameter of the boss section having inner periphery of bearing receptacle bore is gradually increased to cause expansion of the clearance. Therefore, it is preferable not to completely cover the iron of ferro-alloy boss section. Therefore, half or more than half of the boss section made of the iron or ferro-alloy material is uncoated by the material of the flange section, in the shown embodiment.

However, in case that the toughness of the boss section 61 and 71 is great so as to prevent contraction of the internal diameter of the boss section, it is possible to cover the whole body of the boss section by the aluminium material.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A vane-type rotary compressor comprising:
a compressor housing;
a cam ring disposed within said compressor housing and defining an essentially elliptic opening;
a rotor carrying a plurality of rotor vanes for defining working chambers between adjacent vanes, said rotor being coupled with a rotor shaft for rotation therewith;
side plates fitted on both axial ends of the cam ring for closing the both axial ends of the cam ring, each of said side plates comprising a boss section and a flange section radially extending from the boss section, said boss section receiving a bearing member for rotatably supporting said rotor shaft, said flange section being formed of an aluminium containing material, and said boss section being formed of a material having a linear expansion coefficient approximately equal to the linear expansion coefficient of said bearing member; said boss section and said flange section are formed substantially in integral form by insert casting; said boss section is formed with a radially extending portion which is mechanically secured to an associated portion of said flange section; said radially extending portion of said boss section comprises at least one radially extending projection, a through opening is formed through said projection and associated portion of said flange section for receiving a securing means for establishing tight interfitting between said boss section and said flange section.

2. A vane-type rotary compressor as set forth in claim 1, wherein said boss section is surrounded by the material forming said flange section.

3. A vane-type rotary compressor comprising:
a compressor housing;
a cam ring disposed within a compressor housing and defining an essentially elliptic opening;

a rotor carrying a plurality of rotor vanes for defining working chambers between adjacent vanes, said rotor being coupled with a rotor shaft for rotation therewith;

side plates fitted on both axial ends of the cam ring for closing the both axial ends of the cam ring, each of said side plates comprising a boss section and a flange section radially extending from the boss section, said boss section receiving a bearing member made of an iron containing material for rotatably supporting said rotor shaft, said flange section being formed of an aluminium containing material, and said boss section being formed with iron containing material having a linear expansion coefficient approximately equal to the linear expansion coefficient of said bearing member; said boss section is surrounded by the material forming said flange section; said boss section and said flange section are formed substantially in integral form by insert casting; said boss section is formed with a radially extending portion which is mechanically secured to an associated portion of said flange section; said radially extending portion of said boss section comprises at least one radially extending projection, a through opening is formed through said projection and associated portion of said flange section for receiving a securing means for establishing tight interfitting between said boss section and said flange section.

* * * * *